United States Patent [19]

Bien

[11] Patent Number: 5,220,847
[45] Date of Patent: Jun. 22, 1993

[54] MODIFIED TRACTION MOTOR DRIVE WITH HELICAL GEARS AND GEAR INDEXING METHOD THEREFOR

[75] Inventor: Paul R. Bien, Downers Grove, Ill.
[73] Assignee: General Motors Corporation, Detroit, Mich.
[21] Appl. No.: 840,204
[22] Filed: Feb. 24, 1992
[51] Int. Cl.[5] ............................................. F16H 55/18
[52] U.S. Cl. ........................................ 74/409; 74/410; 74/421 A; 105/55; 105/96; 29/893.1
[58] Field of Search ...................... 74/409, 410, 421 A; 105/49, 54, 55, 96, 100; 29/893.1, 893.2

[56] References Cited

U.S. PATENT DOCUMENTS

| | | | |
|---|---|---|---|
| 4,196,046 | 4/1980 | McConnel | 74/409 |
| 4,554,842 | 11/1985 | Wood, III | 74/409 |
| 5,085,093 | 2/1992 | Heidrich | 74/409 X |
| 5,085,619 | 2/1992 | Torii et al. | 74/409 X |

Primary Examiner—Richard M. Lorence
Assistant Examiner—Daniel Wittels
Attorney, Agent, or Firm—Robert J. Outland

[57] ABSTRACT

In a drive with twin helical drive gears on an axle driven by a motor with pinions at either end wherein the moto housing and axle housing are axially located by a key in mating keyways, an offset key is used to obtain axial housing adjustment by the amount of the key offset. The pinions are mounted to the motor with their teeth substantially aligned and the gears are mounted to the axle with their teeth substantially aligned, and the housings are axially positioned by an offset key to compensate for errors in tooth alignment to assure that gear backlash is centralized on both ends of the motor when the rotor is substantially centered in its range of end play.

3 Claims, 1 Drawing Sheet

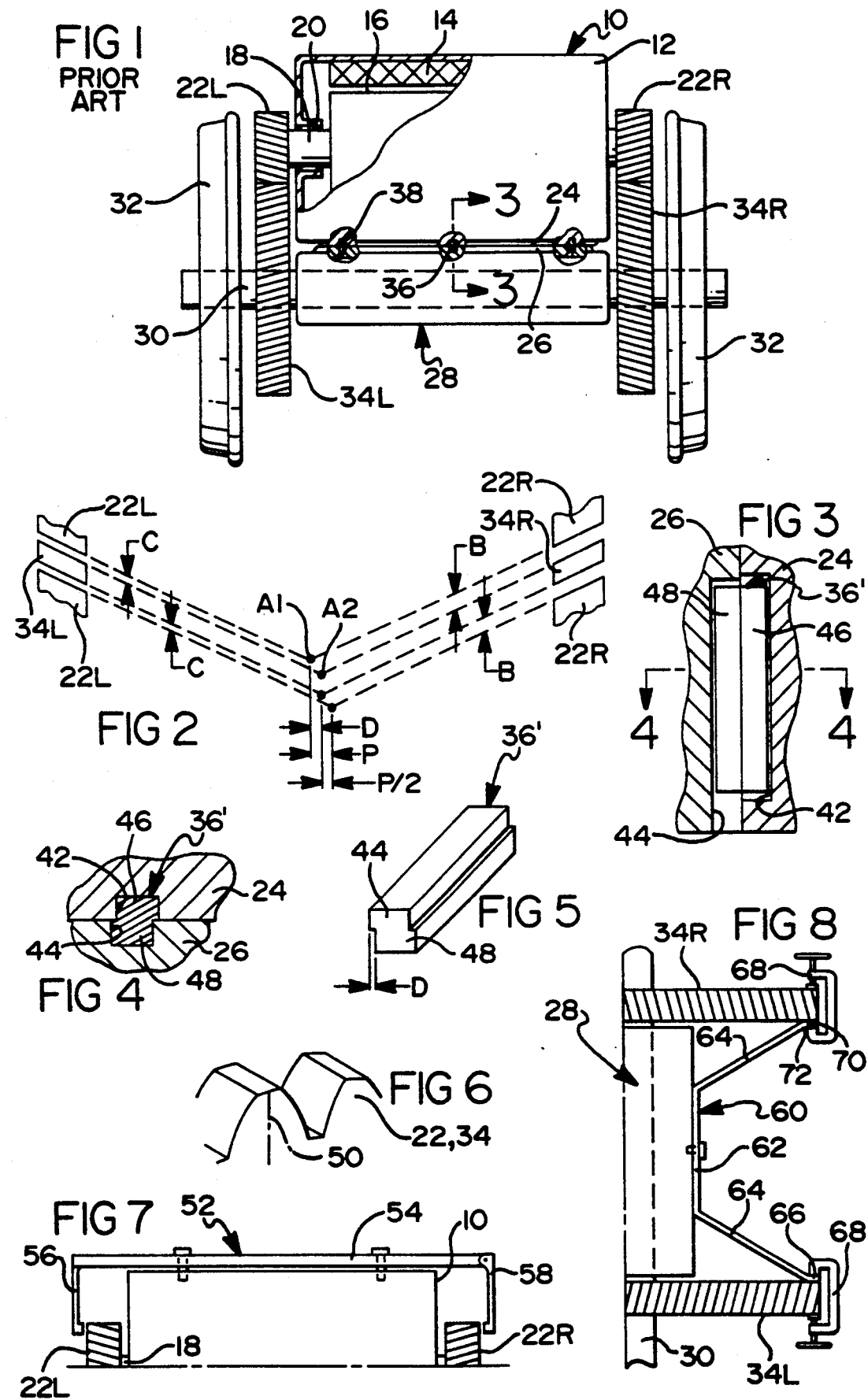

MODIFIED TRACTION MOTOR DRIVE WITH HELICAL GEARS AND GEAR INDEXING METHOD THEREFOR

TECHNICAL FIELD

This invention relates to traction motor drives of the type comprising twin helical gears and particularly to a modified drive mechanism and a method of indexing helical gears for such drives to equalize the gear backlash.

BACKGROUND

It is known in the art relating to traction motor drives of the type used in locomotives to employ a motor having a helical pinion at each end for driving corresponding gears fixed to an axle. The pinions and gears are secured to their respective shaft and axle only by an interference fit. Such a drive is shown in FIG. 1 and includes a motor 10 having a housing 12, stator windings 14 within the housing and a rotor 16 having an output shaft 18 journaled in cylindrical roller bearings 20. Since the cylindrical bearings 20 offer no axial thrust, the rotor is able to move axially throughout a limited range of end play, typically about 0.05 to 0.10 inch. The left end of the shaft 18 carries a pinion 22L and the right end of the shaft 18 carries a pinion 22R. The pinions are both of the helical tooth form type and have opposite helix angles.

The motor 10 is mounted via flanges 24 on the housing 12 to corresponding flanges 26 on an axle housing 28. An axle 30 is journaled in the housing 28 by tapered roller bearings, not shown, which hold the axle 30 against any significant end play. The outboard ends of the axle support wheels 32. Just inboard of the wheels the axle has twin helical gears 34L and 34R which mesh with the pinions 22L and 22R, respectively, and thus have opposite hand and matching helical angles. A square cross section key 36 fits in aligned keyways formed in the axle housing 26 and the motor housing 12 to fix the relative axial positions of the housings, and bolts 38 through the flanges 24 and 26 hold the housings together.

The opposite tooth angles of the right and left pinions and gears have the effect during driving of developing an axial thrust on each pinion which opposes the thrust of the other pinion, and the rotor then tends to shift axially in its housing 12 if the thrust forces are not equal. The rotor seeks a position where the thrust forces equalize, if the end play of the rotor is sufficient to allow movement to such a position, and therefore the same driving torque is transmitted to each gear. Thus, for a given assembly, the axle position determines the rotor position. Due to unequal backlash in the two sets of gears and pinions, the axial rotor position may be slightly different for forward and reverse drive, and thus the rotor will shift axially upon change of drive direction. If the limit of axial travel of the rotor is reached before the thrust forces equalize, the rotor will rub inside the housing.

To accommodate the necessary axial shifting of the rotor as well as dimensional changes due to thermal expansion, the gears and pinions should be indexed so that for the condition of equalized backlash on both ends the rotor should be substantially centered in its range of end play. This centered condition is depicted geometrically in FIG. 2. Pinion teeth 34R and 34L are shown between gear teeth 22R and 22L, respectively. The angle of each tooth face is projected by dashed lines which meet at apex A1 for the tooth faces of one surface of 22L and 22R, and apex A2 for adjacent faces of pinions 34L and 34R. In the example shown, the tooth spacing of the gear teeth 22R is greater than the tooth spacing of gear 22L. When the backlash is equalized or centralized on each end of the assembly, there is a backlash B between each pinion 34R and the adjacent gear 22R and a backlash C between the pinions 34L and gears 22L. The amount of backlash may be on the order of 0.015 or 0.030 inch and for the general case the backlash B is different from the backlash C. Then the apices of the adjacent teeth are not aligned when in the equalized backlash condition but when driving occurs, the torque causes end thrust which moves the rotor endwise sufficiently to align the apices for engaging tooth faces, e.g. A1 and A2. The range of end play P is shown for the case of misalignment such that the rotor position as shown by the apex A2 is considerably spaced by an offset D from the center of the range of end play P. The misalignment severely limits the axial travel of the rotor to the left and may prevent the alignment of apex A2 with apex A1. Thus it is important to assemble or adjust the gear sets so that the rotor is centered within the stator when the backlashes are equalized to afford permissible travel in either direction to effect forward or reverse drive. This will allow the pinion thrusts to become equalized by axial shifting of the rotor when torque is applied.

In the past it has been the practice to manufacture one of the gears 34L or 34R in two pieces comprising an outer toothed gear ring and an inner hub, secured by 18 bolts. The bolts were threaded into one of the pieces and the other piece had an arcuate slot for each bolt to allow angular adjustment. The motor housing 12 would be bolted to the axle housing with the key 36 maintaining the housings at a fixed relative position. The rotor would be locked in the center of its end play and the 18 bolts on the two-piece wheel would be loosened, the gear ring and hub would be angularly adjusted to equalize the gear backlash, and the bolts would be tightened. This laborious process was necessary for each new assembly, and if a motor were to be changed to another axle, the process would have to be repeated to index the gears again.

SUMMARY OF THE INVENTION

The present invention greatly simplifies the indexing of the gears and renders the two-piece gear unnecessary so that a conventional one-piece gear can be used. The key is modified to incorporate an offset to permit axial adjustment of the relative housing positions; otherwise the final assembly is the same as the prior art mechanism. The process of assembling the structure requires that the pinions be mounted on the motor with the teeth substantially aligned and the gears also be mounted on the axle with the teeth substantially aligned. Then to compensate for any errors in the teeth alignments, the axial position of the motor housing on the axle housing is adjusted using the modified key selected from a family of keys having various degrees of offset.

These and other features and advantages of the invention will be more fully understood from the following descriptions of certain specific embodiments of the invention taken with the accompanying drawings.

BRIEF DRAWING DESCRIPTION

In the drawings:

FIG. 1 is a plan view of a prior art traction motor drive assembly;

FIG. 2 is a geometrical diagram illustrating correct gear alignment for the assembly of FIG. 1;

FIG. 3 is a cross section taken along line 3—3 of FIG. 1 showing a modified key according to the invention;

FIG. 4 is a cross section taken along line 4—4 of FIG. 3;

FIG. 5 is an isometric view of the modified key of FIGS. 3 and 4 according to the invention;

FIG. 6 is a fragmentary isometric view of a gear illustrating an index mark on the end face of a tooth;

FIG. 7 is a side view of a motor and pinion assembly with an attached alignment fixture; and FIG. 8 is a side view of an axle and gear assembly with an attached alignment fixture.

DETAILED DESCRIPTION

It is to be understood that the traction motor drive according to the invention is the same as the FIG. 1 mechanism previously described except that both the gears 34L and 34R may be one piece construction instead of one being a bolted-together two piece gear, and the key 36 is modified to permit adjustment of motor housing 12 relative to the axle housing 28. The modified key 36' is shown in FIGS. 3-5. The motor flange 24 has a blind keyway 42 and the axle housing flange 26 has an open-ended keyway 44, each containing half of the key 36'. The side 46 of the key 36' residing in the keyway 42 is offset by a dimension D of several thousandths of an inch from the side 48 of the key residing in the keyway 44. A conventional square cross-section keyway 36 forces the keyways to be in alignment at a nominal housing position, but the offset key 36' allows the keyways to be likewise offset, thereby permitting the housings to be offset in either direction from the nominal position. A given key 36' can effect a housing offset in either direction depending on the orientation of the key in the assembly. By providing a family of keys 36' with different amounts of offset, a key can be selected to provide a desired adjustment of relative housing position. For a key which is nominally ⅜ inch square, a key family having a series of offsets in increments of 0.005 inch provides a sufficient accuracy of adjustment by selection of the closest offset for the required correction.

The traction motor drive is assembled, for example, by heat shrinking the pinions to the motor shaft with the pinion teeth substantially aligned, heat shrinking or press fitting one gear to the axle, assembling the axle to the axle housing, heat shrinking or press fitting the other gear to the axle with the gear teeth substantially aligned, and securing the motor housing to the axle housing so that the opposite pinion/gear sets each have equalized gear backlash when the rotor is at or near the center of its end play range, using an offset key, if necessary, to establish the relative axial housing position. If the gear alignment and pinion alignment were sufficiently accurate, the axial offset of the housings would not be necessary, but taking into account the precision of practical assembly techniques for such large parts and the lack of machined keyways for the axle and motor shaft, it is expected that the axial adjustment would usually be used.

FIG. 6 illustrates an index mark 50 on the end face of a gear 34 or pinion 22 tooth which marks its exact center. The mark may be in the form of a notch, hole or pin which accommodates the gear or pinion alignment procedure. A number of alignment procedures using mechanical and/or optical instruments can be visualized. A suggested pinion alignment fixture is shown in FIG. 7 wherein a fixture 52 is temporarily bolted to the motor housing 12 and has a base 54 supporting aligned end pieces 56 and 58 extending toward the pinions 22R and 22L, with the end piece 58 hinged to the base 54 to facilitate pinion installation. In this case, the index marks 50 are on the outboard sides of the pinions. The first pinion 22L is mounted onto the axle in any position and then, with the fixture 52 in place, the rotor is turned to align the mark 50 with the end piece 56 and locked in place. Then a second pinion 22R is mounted on its shaft end by heat shrinking or hydraulic expansion techniques and rotated to align the mark 50 with the end piece 58, and held there until the pinion locks onto the motor shaft by cooling or by removal of expanding hydraulic pressure.

Gears are assembled to the axle with the axle vertical, as shown in FIG. 8, so that a hoist can maneuver the gears. First, the lower gear 34L is assembled and heat shrunk or press fit onto the axle 30 and then a fixture 60 is bolted or clamped to the axle housing 28. The fixture 60 has a base 62 attached to the housing and upper and lower diagonals 64 extending toward the upper and lower gear teeth. The lower diagonal terminates in an index element 66 which is aligned with the index mark 50 on the inboard face of the gear 34L and held in place with a C-clamp 68. The upper diagonal terminates in an index element 70 which is aligned with the lower element 66 and the index mark on the lower gear. The heated gear 34R has a guide block 72 clamped by another clamp 68 to its toothed rim with one face of the guide block aligned with the index mark 50 on the tooth face, and the gear is mounted on the axle and positioned with the guide block 72 just touching the index element 70. Thus the gear teeth are aligned and the gear 34R is held in place until it cools and shrinks onto the axle.

Before the motor is assembled to the axle housing, the rotor end play is measured by a dial indicator applied to the end of the motor shaft and the central position of the rotor is determined. Next the housings 12 and 28 are axially positioned with a trial key 36', which preferably has no offset, and temporarily bolted together. The gear backlash is equalized or centralized at both ends by using a feeler gauge at one end to center a pinion tooth in a gear tooth space, maintaining the correct spacing by temporary shims, and equalizing or centralizing the backlash on the other end by sliding the rotor axially until the backlash on both sides of a pinion tooth are equal as verified by a feeler gauge. The axial position of the rotor is again measured by a dial indicator and its deviation from the rotor central position is determined, thereby yielding the axial adjustment D necessary to equalize the backlash when the rotor is centered. Then the shims are removed. If no adjustment is necessary, the "temporary" bolting becomes permanent. If adjustment is necessary, the housings are unbolted, the trial key removed, the offset key providing the needed axial adjustment D is installed, and the bolts permanently replaced.

It should be recognized that the use of an offset key and the process of aligning the pinion teeth and the gear teeth coupled with compensation for any alignment errors by axial adjustment of the housings greatly simplifies the indexing of gears in a traction motor drive, and moreover makes the interchange of motor assemblies to other axle assemblies relatively easy.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A method of indexing gears and pinions in assembly of a traction motor drive having twin helical toothed gears on a common axle meshing with corresponding helical toothed pinions on opposite ends of a motor rotor to define two gear and pinion sets each having backlash, and a motor housing carrying the rotor and adjustably secured to an axle housing carrying the axle, wherein the rotor has a range of end play in the motor housing and there is an axial rotor position where the gear backlash is equalized in both gear and pinion sets; said method of indexing the gears and pinions comprising the steps of:

assembling the pinions to the rotor with the pinion teeth substantially aligned rotationally;
   assembling the axle to the axle housing;
   assembling the gears to the axle with the gear teeth substantially aligned rotationally; and
   assembling the axle housing to the motor housing including the step of relatively locating the housings axially to equalize the gear backlash in each gear and pinion set with the rotor approximately centered on its range of end play, wherein the housings have cooperating keyways for accepting a common key, and wherein the step of relatively locating the housings includes inserting an offset key dimensioned for holding the keyways in a relative position required to equalize the gear backlash.

2. The method as defined in claim 1 wherein the step of relatively locating the housings further includes the steps of:

determining an axial center of the rotor in its range of end play in the motor housing;
   assembling the housings and temporarily locating the housings axially with a trial key;
   equalizing the backlash in each gear and pinion set by adjusting the axial position of the rotor;
   then determining the displacement of the rotor from the axial center; and
   replacing the trial key with a permanent key having an offset selected on the basis of the said displacement of the rotor to approximately center the rotor in the motor housing.

3. A traction motor drive having;

a motor housing containing a rotor;
   twin helical pinions carried by the rotor;
   an axle supporting twin helical gears meshing with the helical pinions on the motor rotor to form two gear and pinion sets wherein each gear and pinion set has some backlash;
   the rotor being movable axially in the motor housing through a limited range to a position relative to the axle where the backlash on each gear and pinion set is centralized;
   an axle housing supporting the axle and establishing the axial position of the axle;
   a pair of cooperating keyways, one on each housing; and
   a common key in the keyways for axially positioning the housings, the key having a first side for engagement with the keyway in the axle housing and a second side for engagement with the keyway in the motor housing, and the first side being offset in the axial direction from the second side by an amount sufficient to substantially center the rotor in the said limited range when the backlash is centralized in both gear and pinion sets.

* * * * *